United States Patent
Park (10) Patent No.: US 9,022,167 B2
(45) Date of Patent: May 5, 2015

(54) HYBRID POWER STEERING SYSTEM

(71) Applicant: Mando Corporation, Pyeongtaek-Si, Gyeonggi-do (KR)

(72) Inventor: Jung Sik Park, Gyeonggi-do (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 18 days.

(21) Appl. No.: 13/760,861

(22) Filed: Feb. 6, 2013

(65) Prior Publication Data

US 2013/0199865 A1 Aug. 8, 2013

(30) Foreign Application Priority Data

Feb. 6, 2012 (KR) .................. 10-2012-0011738

(51) Int. Cl.
| | | |
|---|---|---|
| B62D 5/00 | (2006.01) | |
| B62D 5/04 | (2006.01) | |
| B62D 5/065 | (2006.01) | |
| B62D 5/30 | (2006.01) | |
| B62D 6/00 | (2006.01) | |
| B62D 6/02 | (2006.01) | |

(52) U.S. Cl.
CPC .............. B62D 5/0463 (2013.01); B62D 5/065 (2013.01); B62D 5/30 (2013.01); B62D 6/007 (2013.01); B62D 6/02 (2013.01)

(58) Field of Classification Search
CPC .................................. B62D 5/003; B62D 5/30
USPC .................................................. 180/405–407
See application file for complete search history.

(56) References Cited

U.S. PATENT DOCUMENTS

| | | | | |
|---|---|---|---|---|
| 5,826,676 | A * | 10/1998 | Ko ................................ | 180/403 |
| 6,336,519 | B1 * | 1/2002 | Bohner et al. ................ | 180/403 |
| 6,502,661 | B1 * | 1/2003 | Heitzer ......................... | 180/403 |
| 6,546,322 | B2 * | 4/2003 | Williams ....................... | 701/41 |
| 6,612,393 | B2 * | 9/2003 | Bohner et al. ................ | 180/405 |
| 6,978,859 | B2 * | 12/2005 | Torizawa ...................... | 180/405 |
| 7,306,070 | B2 * | 12/2007 | Kobayashi .................... | 180/406 |
| 7,617,906 | B2 * | 11/2009 | Williams ...................... | 180/422 |
| 8,066,091 | B2 * | 11/2011 | Ito et al. ........................ | 180/403 |
| 8,483,910 | B2 * | 7/2013 | Williams et al. ............. | 701/41 |
| 2007/0095598 | A1 * | 5/2007 | Williams ...................... | 180/441 |
| 2008/0289897 | A1 * | 11/2008 | Williams ...................... | 180/402 |
| 2009/0038876 | A1 * | 2/2009 | Ito et al. ........................ | 180/421 |
| 2010/0070136 | A1 * | 3/2010 | Williams et al. ............. | 701/41 |
| 2010/0152971 | A1 * | 6/2010 | Shiino et al. .................. | 701/41 |

* cited by examiner

*Primary Examiner* — Joseph Rocca
*Assistant Examiner* — Michael Stabley
(74) *Attorney, Agent, or Firm* — McDermott Will & Emery LLP (57) ABSTRACT

In a hybrid power steering system, two steering assisters for supporting a steering force when the driver operates the steering wheel. The steering supporting force can be divisionally used according to the increase of speed and weight of a vehicle, thereby reducing the load applied to any of the steering assisters such that operating noise can be reduced and the endurance can be increased. Further, a motor of a lower power specification may be used even in the case of a truck or a bus that requires a relatively high steering force as compared to a passenger vehicle. Accordingly, production costs can be reduced and a sufficient steering supporting force can be obtained, thereby improving the driver's convenience, and enhancing fuel efficiency while increasing energy efficiency. Further, the steering can be safely maintained even when one of the steering assisters is not operating normally while the vehicle is being driven.

10 Claims, 5 Drawing Sheets

HYBRID POWER STEERING SYSTEM

CROSS-REFERENCE TO RELATED APPLICATION

This application claims priority from and the benefit under 35 U.S.C. 5119(a) of Korean Patent Application No. 10-2012-0011738, filed on Feb. 6, 2012, which is hereby incorporated by reference for all purposes as if fully set forth herein.

BACKGROUND OF THE INVENTION

1. Field of the Invention

The present invention relates to a hybrid power steering system. More particularly, the present invention relates to a hybrid power steering system that includes two steering assisters for supporting a steering force when a driver operates a steering wheel so as to allow the steering supporting force to be divisionally used according to the increase of speed and the weight of a vehicle, thereby reducing a load applied to any one of the steering assisters such that operating noise can be reduced and endurance can be increased, and allow the use of a motor of a lower power specification even in a case of a truck or a bus that requires a relatively high steering force as compared to a passenger vehicle, so as to reduce production costs and obtain a sufficient steering supporting force, thereby improving the driver's convenience, enhancing fuel efficiency while increasing energy efficiency, and safely maintaining the steering even when one of the steering assisters is not operating normally while the vehicle is being driven.

2. Description of the Prior Art

As generally known in the art, a vehicle steering system is an apparatus that allows a driver to intentionally change the proceeding direction of the vehicle, in which the steering system supports the driver in such a manner that the driver optionally may change the center of rotation, about which the front wheels of the vehicle are turned, so as to cause the vehicle to proceed in a direction desired by the driver.

Meanwhile, when the driver operates the steering wheel of the vehicle, the power steering system supports the steering wheel operating force of the driver using a servo apparatus such that the driver can readily change the proceeding direction of the vehicle with a smaller force.

Such a power steering system is generally classified into an electric power steering (EPS) system and a hydraulic power steering (HPS) system.

The hydraulic power steering system is a steering system configured such that when an oil pump connected to a rotating shaft of an engine supplies hydraulic oil to an actuating cylinder connected with a rack bar, the piston of the actuating cylinder that is supplied with the hydraulic oil is moved to support the steering operation force, thereby allowing the driver to perform a steering operation with a small force.

Meanwhile, the electric power steering system is a steering system that includes a motor in place of the oil pump and the actuating cylinder to support the operating force of the steering wheel with the force of the motor.

Figure 1:
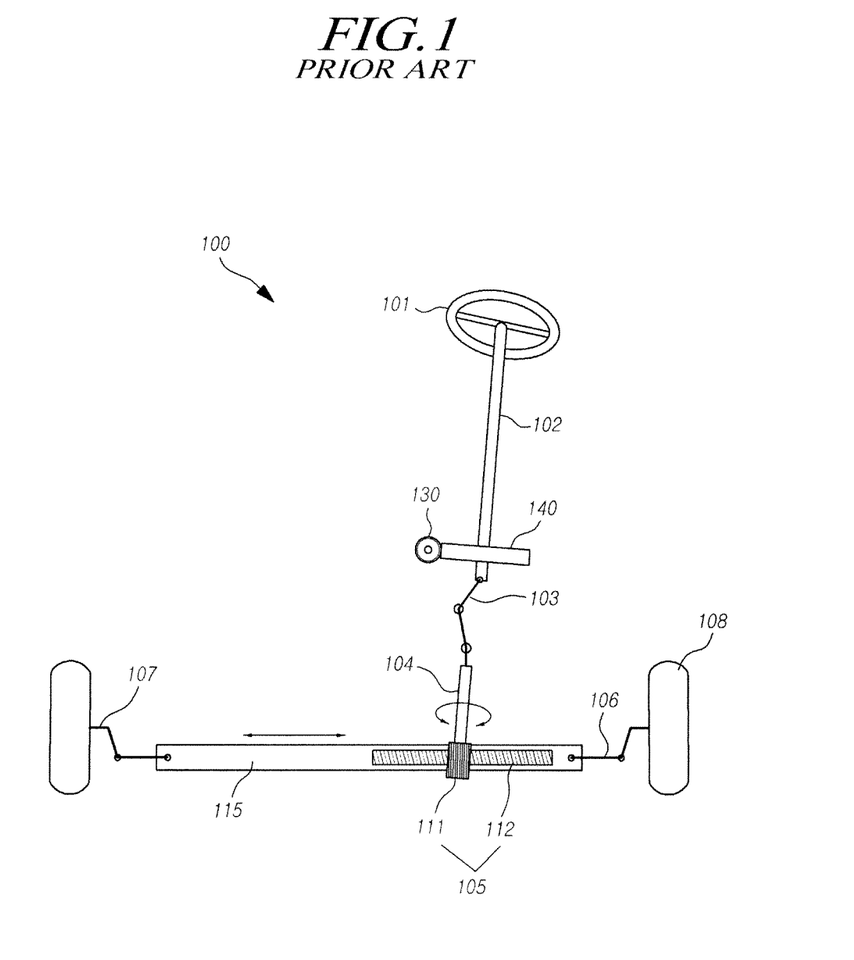
FIG. 1 illustrates a configuration of a conventional electric power steering system.

FIG. 1 is a schematic view of a conventional electric power steering system.

As illustrated in FIG. 1, the electric power steering system includes a steering system 100 extending from a steering wheel 101 to a pair of opposite vehicle wheels 108, and an auxiliary power mechanism that supplies a steering auxiliary power to the steering system 100.

The steering system 100 includes a steering shaft 102, one end of which is connected to the steering wheel 101 to be rotated together with the steering wheel 101, and the other end of which is connected to a pinion shaft 104 via a pair of universal joints 103. In addition, the pinion shaft 104 is connected to a rack bar through a rack-and-pinion mechanism 105, and the opposite ends of the rack bar is connected to each of the vehicle wheels 108 through a tie rod 106 and a knuckle arm 107. The rack-and-pinion mechanism 105 is configured by a pinion gear 111 formed on a pinion shaft 104, and a rack gear 112 formed on a side of a circumferential surface of a rack bar in which the pinion gear 111 and the rack gear 112 are engaged with each other. Therefore, when the driver operates the steering wheel 101, a torque is produced in the steering system 100, and the vehicle wheels 108 are steered by the torque transmitted through the rack-and-pinion mechanism 105 and the tie rods 106.

The auxiliary power mechanism includes a motor 130 that generates an auxiliary power, and a reducer 140 configured by a worm wheel and a worm to transmit the auxiliary power generated by the motor to the steering shaft 102.

Figure 2:
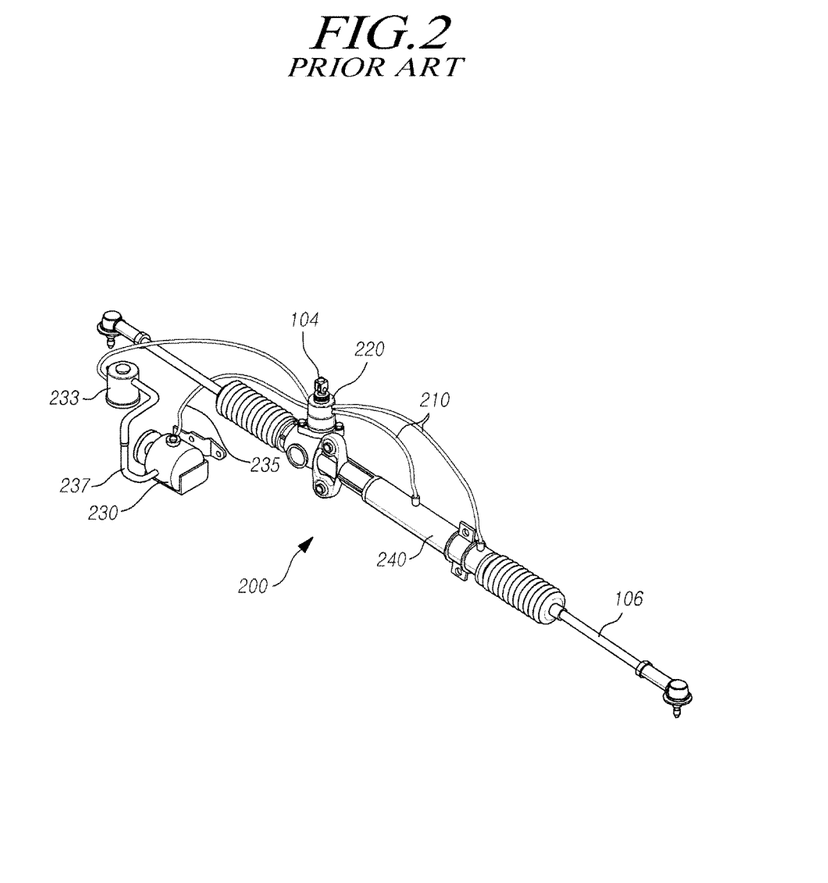
FIG. 2 illustrates a configuration of a conventional hydraulic power steering system.

FIG. 2 is a perspective view illustrating a conventional hydraulic power steering system.

As illustrated in FIG. 2, the conventional hydraulic power steering system 200 includes: pinion valve assembly 220 installed at a lower end of the steering shaft equipped with the steering wheel 101 (see FIG. 1) to control the flow direction of the hydraulic oil at the time of steering; and an actuating cylinder 240 configured to apply an acting force to the tie rods 106 that steer the vehicle wheels 108 for steering according to the operation of a pinion valve assembly 220.

The hydraulic power steering system 200 has a hydraulic pressure system in which when the hydraulic oil supplied from the oil pump 230 is supplied to the pinion valve assembly 220 through a pressure hose 235, and the hydraulic oil is selectively supplied to left and right pressure chambers of the actuating cylinder 240 depending on the rotating direction of the steering shaft at the time of steering, the rack bar is slid left or right by the hydraulic pressure to support the steering operating force, and the hydraulic oil, which has completed the action in the pinion valve assembly 220, is returned to an oil storage tank 233 and supplied again to the oil pump 230 through a suction hose 237.

The conventional electric power steering system has problems in that when the errors in manufacturing and assembling in the coupling portions of the worm shaft and the motor shaft accumulate, a non-smooth feeling of a bearing is caused at the time of a large output of power, and the rotational resistance of the worm shaft is increased, in that when the endurance of the worm and the worm wheel is consumed, a gap is formed and a rattle noise is produced due to the backlash, in that when the driver operates the steering handle, the driver experiences an unpleasant feeling due to the impact transferred from a road surface through the vehicle wheels and the steering shafts, and the rattle noise, and in that a high power motor intensifies the operating noise and increases the price.

Also, the hydraulic power steering system has problems in that the hydraulic power steering system increases the manufacturing costs because it is relatively expensive as compared to an electric power steering system, the volume of the hydraulic power steering system is increased in order to provide a required steering supporting force, thereby reducing the fuel efficiency of the vehicle, and in the case of a large output of power, the fluid noise of the hydraulic noise is increased.

In addition, in the situation where the motor or the oil pump stops for any reason, the driver's steering wheel operating force could be abruptly increased, which could cause a fatal safety issue.

SUMMARY OF THE INVENTION

Accordingly, the present invention has been made to solve the above-mentioned problems occurring in the prior art, and an object of the present invention is to provide a hybrid power steering system that includes two steering assisters for supporting a steering force when a driver operates a steering wheel so as to allow the steering supporting force to be divisionally used according to the increase of speed and weight of a vehicle, thereby reducing a load applied to any one of the steering assisters such that operating noise can be reduced and endurance can be increased.

Also, another object of the present invention is to provide a hybrid power steering system that may use a motor of a lower power specification even in a case of a truck or a bus that requires a relatively high steering force as compared to a passenger vehicle, so as to reduce production costs and obtain a sufficient steering supporting force, thereby improving the driver's convenience, and enhancing fuel efficiency while increasing energy efficiency.

Further, another object of the present invention is to provide a hybrid power steering system capable of safely maintaining the steering even when one of the steering assisters is not operating normally while the vehicle is being driven.

In order to accomplish these objects, there is provided a hybrid power steering system including: a first steering assister configured to rotate a steering shaft in a forward or reverse direction using the driving force of a first motor so as to support a steering force; a second steering assister configured to rotate a sector shaft of a gear box in a forward or reverse direction using the hydraulic pressure of the hydraulic oil of an oil pump driven by a second motor so as to support the steering force; a torque sensor configured to sense the rotational torque of the steering shaft; a speed sensor configured to sense vehicle speed; and an electronic control unit configured to send target electric current value control signals to the first motor and the second motor according to input signals input from the torque sensor and the speed sensor, respectively.

According to the present invention, since two steering assisters for supporting a steering force when a driver operates a steering wheel are provided, the steering supporting force can be divisionally used according to the increase of speed and weight of a vehicle, thereby reducing a load applied to any one of the steering assisters such that operating noise can be reduced and endurance can be increased.

Also, according to the present invention, since a motor of a lower power specification may be used even in a case of a truck or a bus that requires a relatively high steering force as compared to a passenger vehicle, production costs can be reduced and a sufficient steering supporting force can be obtained, thereby improving the driver's convenience, and enhancing fuel efficiency while increasing energy efficiency.

Further, according to the present invention, the steering can be safely maintained even when one of the steering assisters is not operating normally while the vehicle is being driven.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
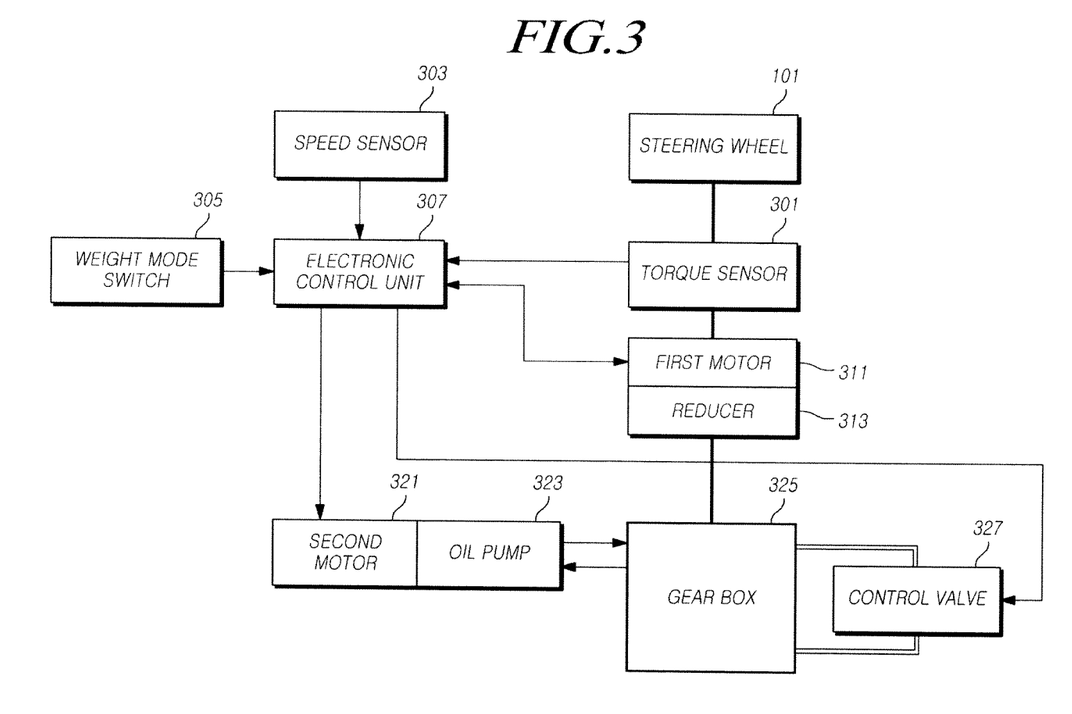
FIG. 3 illustrates a hybrid power steering system according to an exemplary embodiment of the present invention.
Figure 4:
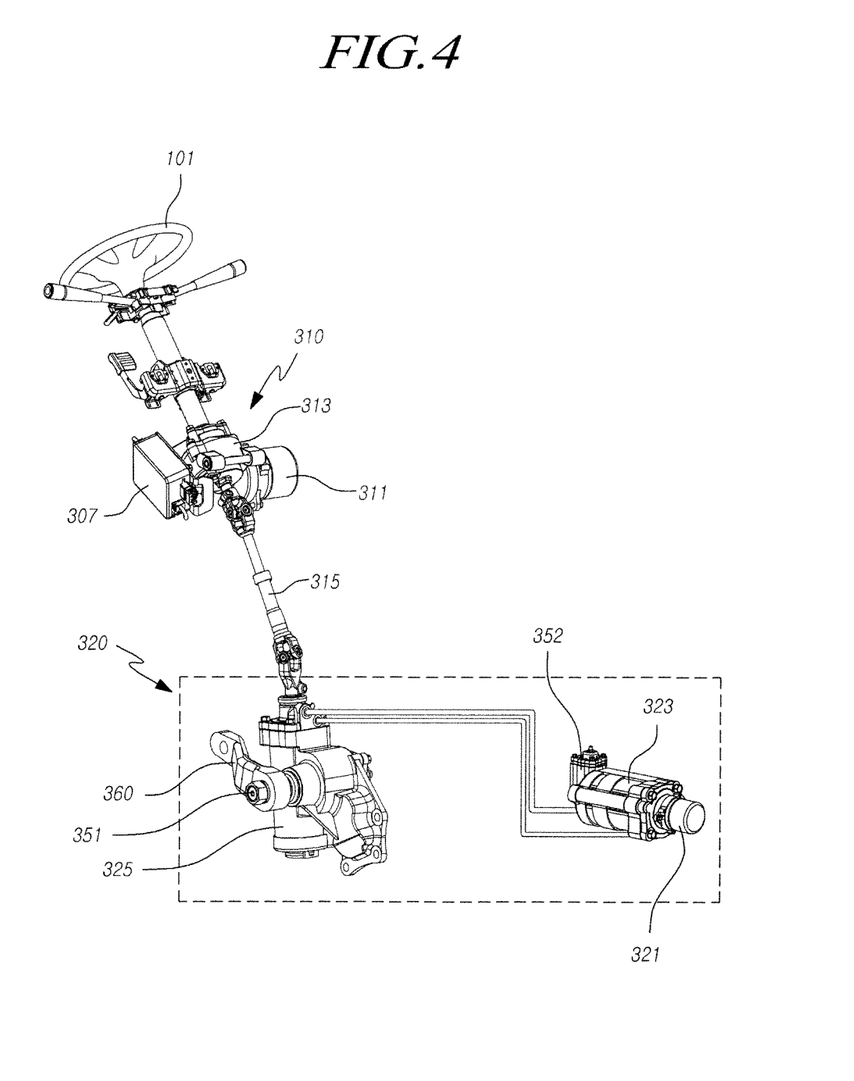
FIG. 4 is a perspective view schematically illustrating a hybrid power steering system according to an exemplary embodiment of the present invention.
Figure 5:
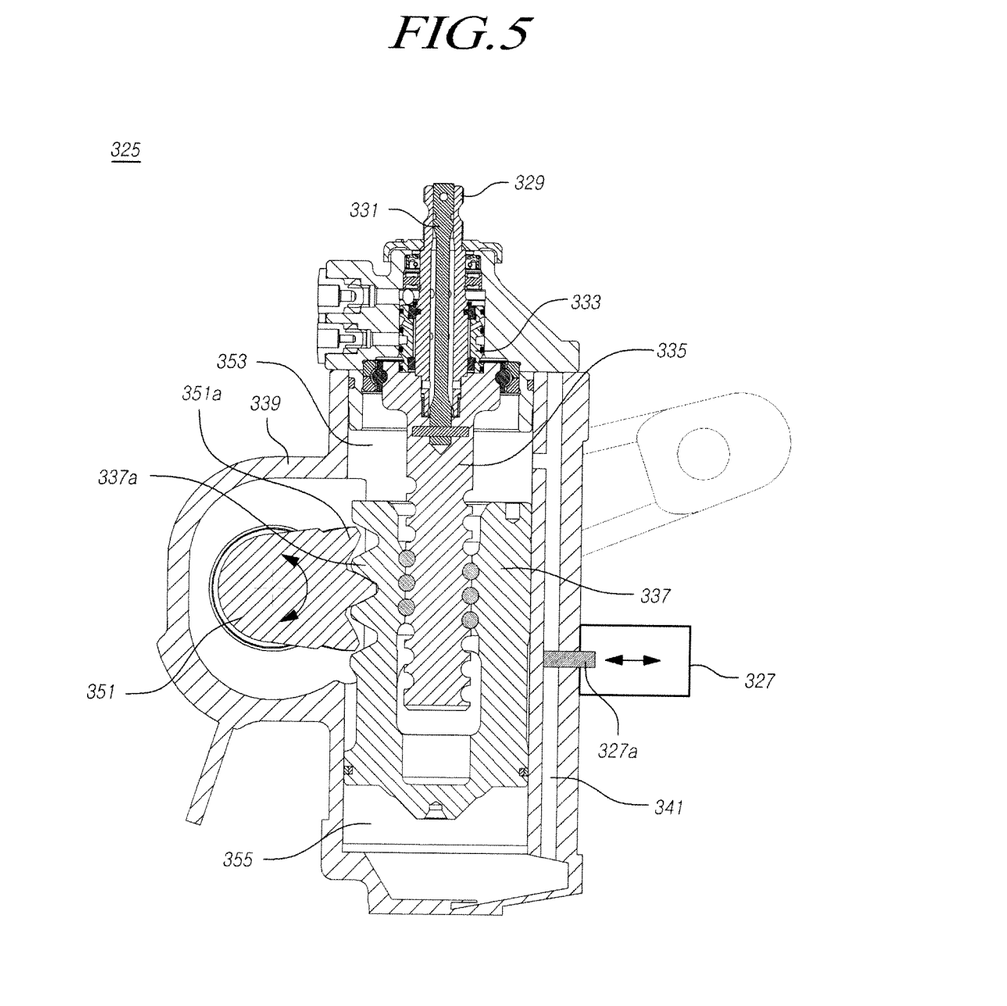
FIG. 5 is a cross-sectional view illustrating the gear box of FIG. 4.

FIG. 3 illustrates a hybrid power steering system according to an exemplary embodiment of the present invention, FIG. 4 is a perspective view schematically illustrating a hybrid power steering system according to an exemplary embodiment of the present invention, and FIG. 5 is a cross-sectional view illustrating the gear box of FIG. 4.

As illustrated in FIG. 3, the hybrid power steering system according to an exemplary embodiment of the present invention includes: a first steering assister 310 configured to rotate a steering shaft in a forward or reverse direction using the driving force of a first motor 311 so as to support a steering force; a second steering assister 320 configured to rotate a sector shaft 351 of a gear box 325 in a forward or reverse direction using the hydraulic pressure of the hydraulic oil of an oil pump 323 driven by a second motor 321 so as to support the steering force; a torque sensor 301 configured to sense the rotational torque of the steering shaft; a speed sensor 303 configured to sense vehicle speed; and an electronic control unit 307 configured to send target electric current value control signals to the first motor 311 and the second motor 321 according to input signals input from the torque sensor 301 and the speed sensor 303, respectively.

That is, the torque sensor 301, which is configured to sense the rotating direction and torque value of a steering shaft 102 (see FIG. 1) that is interlockingly rotated with a steering wheel 101 when the driver operates the steering wheel 101, senses whether a driver turns a vehicle left or right is determined, and a torque applied to operate the steering wheel 101, and sends a signal for the sensed results to the electronic control unit 307.

In addition, the speed sensor 303 provided in the vehicle senses whether the vehicle is being driven or being stopped, and the running speed of the vehicle, and the sends a signal for the sensed results to the electronic control unit 307.

According to these input signals, the electronic control unit 307 produces and sends target electric current value control signals to the first steering assister 310 and the second steering assister 320, respectively, such that the steering assisters 310 and 320 can support the operating force in a direction where the driver operates the steering wheel 101.

The first steering assister 310 and the second steering assister 320 rotate the steering shaft 102 or the sector shaft 351 in the same direction as the direction the driver rotates the steering wheel 101 according to the control signals input from the electronic control unit 307, respectively, thereby supporting the driver's steering force.

Here, the first steering assister 310 includes: a reducer 313 including a worm wheel connected and rotated with the steering shaft 102, and a worm shaft adapted to tooth-mesh with the worm wheel to rotate the worm wheel connected with the steering shaft 102; and the first motor 311 configured to rotate the worm shaft in a forward or reverse direction according to a control signal control signal input from the electronic control unit 307.

The first steering assister 310 is an electric steering assister that uses the driving force of a motor, and is coupled with the reducer 313 to rotate the steering wheel 101 with the driving force of the first motor 311. The reducer 313 is adapted to adjust the speed of revolution of the motor to be suitable for rotating the steering shaft 102.

The reducer 313 is configured by the worm wheel and the worm shaft, in which when the work wheel and the worm shaft are interlockingly operated by the driving force of the motor, the reducer 313 rotates the steering shaft 102 while being reduced in speed according to the gear ratio of the worm wheel and the worm shaft, thereby supporting the driver's steering force. The steering shaft 102 is connected to the center of the worm wheel to be interlockingly rotated with the worm wheel, and as the worm shaft tooth-meshing with this worm wheel is rotated by the driving force of the motor, the worm wheel is rotated, thereby supporting the steering force of the steering shaft 102.

At this time, the first motor 311 rotates the worm shaft in a forward or reverse direction according to the control signal input from the electronic control unit 307, thereby supporting the driver's steering force of the steering wheel 101.

In addition, the second steering assister 320 includes an oil pump 323 coupled to the second motor 321 to deliver the hydraulic oil; a screw nut 337 configured to be slid to one side or the other side according to the hydraulic pressure of the hydraulic oil; a gear box housing 339 accommodating the screw nut 337 and provided with a first cylinder 355 and a second cylinder 353, which are filled with the hydraulic oil, on one side and the other side with reference to the screw nut 337; and a sector shaft 351 accommodated in the gear box housing 339 and tooth-meshing with the screw nut 337 to be rotated in a forward or reverse direction when the screw nut 337 is slid, thereby operating a pitman arm 360.

The second steering assister 320 is a hydraulic steering assister using the hydraulic pressure of the oil pump 323, in which the screw nut 337 is slid to one side or the other side according to the hydraulic pressure of the hydraulic oil and rotates the sector shaft 351, thereby supporting the driver's steering force.

With the second steering assister 320, when an input shaft 329 connected to the steering shaft and the universal joint via an intermediate shaft 315 is rotated, a ball screw 335 coupled with the input shaft 329 via a torsion bar 331 is rotated, and the screw nut 337 coupled to the ball screw 335 via a ball is rotated, thereby rotating the sector shaft 351.

The ball screw 335 is formed with a screw groove on the outer circumferential surface thereof, the screw nut 337, into which the ball screw 335 is inserted, is formed with a screw groove, which corresponds to the screw groove of the ball screw 335, on the inner circumferential surface thereof, and several balls are fitted in these screw grooves.

The screw nut 337 is formed with gear teeth 337a on the outer circumferential surface thereof to drive the sector shaft 351 that is formed with gear teeth 351a engaged with the gear teeth 337a of the screw nut 337.

In addition, since the sector shaft 351 is coupled to the pitman arm 360, a tie rod or a knuckle is operated by a link coupled to the other end of the pitman arm 360 when the sector shaft 351 is rotated, thereby steering the vehicle wheels.

When the input shaft 329 is rotated, the hydraulic oil flows into the first cylinder 355 or the second cylinder 353 of the gear box housing 339 through several hydraulic oil inlet holes and outlet holes formed in a valve body 333 coupled to enclose the input shaft 329 such that the screw nut 337 is slid to one side or the other side by the hydraulic pressure of the hydraulic oil, thereby supporting the rotating force of the input shaft 329 and the ball screw 335, i.e., the steering force.

Here, the electronic control unit 307 sends the target electric current value control signals to the first motor 311 and the second motor 321 according to the input signals input from the torque sensor 301 and the speed sensors 303, respectively. When the input signal value input from the speed sensor 303 is larger than a preset vehicle speed value, the sending of the target electric current value control signal to the second motor 321 is stopped.

Accordingly, when the vehicle is driven with a speed larger than the preset vehicle speed, the operation of the second steering assister 320 is stopped, and the steering may be performed only by the steering supporting force of the first steering assister 310.

In addition, the gear box housing 339 is provided with a circulation flow line 341 that interconnects the first cylinder 355 and the second cylinder 353, and a control valve 327 that opens or closes the circulation flow line 341. Accordingly, when the operation of the second steering assister 320 is stopped under a circumstance where the vehicle is driven with a speed higher than the preset vehicle speed, the hydraulic oil is allowed to freely flow to the first cylinder 355 and the second cylinder 353.

That is, upon stopping the sending of the target electric current value control signal to the second motor 321 as in the above-described circumstance, the electronic control unit 307 sends a control signal such that the control valve 327 opens the circulation flow line 341, and the control valve 327 moves the valve tip 327a to the outside to close the circulation flow line 341, thereby preventing the steering force from being increased by the hydraulic pressure of the hydraulic oil filled in the first cylinder 355 and the second cylinder 353.

Meanwhile, the hybrid power steering system may be provided with a weight mode switch 305 to select a high weight mode and a low weight mode, and to send a related signal to the electronic control unit 307.

In such a case, the electronic control unit 307 sends a target electric current value control signal to each of the first motor 311 and the second motor 321 according to the input signals input from the torque sensor 301 and the speed sensor 303, in which when the input signal input from the weight mode switch 305 is the high weight mode, the target electric current value control signal sent to the second motor 321 is increased.

Accordingly, when a great amount of freight is loaded on the vehicle, or the passengers of the vehicle are increased, the driver may select the high weight mode by the weight mode switch 305 such that a higher steering supporting force can be obtained from the second steering assister 320.

That is, as described above, in the low weight mode, the target electric current value control signals are sent to the first motor 311 and the second motor 321 according to the input signals input from the torque sensor 301 and the speed sensor 303 such that an ordinary steering supporting force is obtained, and when a higher steering supporting force is required, the high weight mode may be selected as described above.

The electronic control unit 307 determines whether the vehicle is to be turned left or right from the torque sensor 301, and determines whether the vehicle is driven with high speed or low speed from the speed sensor 303. When it is determined that the vehicle is driven with high speed, the electronic control unit 307 sends a control signal to divide the amount of supporting the steering force of the first steering assister 310 and the second steering assister 320 according to the preset target electric current value, and when it is determined that the vehicle is driven with low speed, the operation of the second steering assister 320 is stopped.

In addition, when the high weight mode is selected even in the low speed, the target electric current value control signal sent to the second motor 321 is increased such that the steering supporting force of the second steering assister 320 is increased as compared to the normal steering supporting force.

This is to prevent the driver from feeling the noise from the first steering assister 310 as being relatively increased as compared to the noise from the second steering assister 320 when the output power is increased. The first steering assister 310 is positioned inside a dash board which is close to the driver's seat, and the second steering assister 320 is positioned in the lower side of an engine room.

In addition, it may be used that the second steering assister 320 using the hydraulic pressure outputs a relatively higher power as compared to the first steering assister 310 using the driving force of the motor.

Further, the first steering assister 310 is provided with a first electric current sensor that measures and sends the electric current value of the first motor 311 to the electronic control unit 307, and the electronic control unit 307 is configured such that when the electric current value input from first electric current sensor is different from the target electric current value sent to the first motor 311, the electronic control unit 307 stops the sending of the target electric current value control signal to the first motor 311 and increases the target electric current value sent to the second motor 321.

Moreover, the second steering assister 320 is also provided with a second electric current sensor that measures and sends the electric current value of the second motor 321 to the electronic control unit 307, and the electronic control unit 307 is configured such that when the electric current value input from the second electric current sensor is different from the target electric current value sent to the second motor 321, the electronic control unit 307 stops the sending of the target electric current value control signal to the second motor 321 and increases the target electric current value sent to the first motor 311.

Accordingly, when one of the first steering assister 310 and the second steering assister 320 is not operating normally while the vehicle is being driven, the steering force supporting amount of the other operating normally one is increased such that the driver's steering force can be continuously supported.

For example, when there is something wrong with the first motor 311 of the first steering assister 310, the target electric current value sent to the first motor 311 and the electric current value measured by the first electric current sensor and input to the electronic control unit 307 will be different from each other. Therefore, the sending of the target electric current value control signal from the electronic control unit 307 to the first motor 311 is stopped to stop the operation of the first motor 311, and the target electric current value sent to the second motor 321 is increased. Consequently, the steering supporting force can be constantly maintained.

That is, since the second steering assister 320 provides the steering force supporting amount of the first steering assister 310 as well, the user can conduct safe steering while the vehicle is being driven.

According to the present invention having the features and configurations as described above, since two steering assisters for supporting a steering force when the driver operates the steering wheel, the steering supporting force can be divisionally used according to the increase of speed and weight of a vehicle, thereby reducing the load applied to any of the steering assisters such that operating noise can be reduced, and the endurance can be increased.

Also, according to the present invention, since a motor of a lower power specification may be used even in a case of a truck or a bus that requires a relatively high steering force as compared to a passenger vehicle, production costs can be reduced and a sufficient steering supporting force can be obtained, thereby improving the driver's convenience, and enhancing fuel efficiency while increasing energy efficiency.

Further, according to the present invention, the steering can be safely maintained even when one of the steering assisters is not operating normally while the vehicle is being driven.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A hybrid power steering system comprising:
   a first steering assister configured to rotate a steering shaft in a forward or reverse direction using a driving force of a first motor to support a steering force;
   a second steering assister configured to rotate a sector shaft of a gear box in a forward or reverse direction using a hydraulic pressure of a hydraulic oil of an oil pump driven by a second motor to support the steering force;

a torque sensor configured to sense a rotational torque of the steering shaft;

a speed sensor configured to sense a vehicle speed; and an electronic control unit configured to send target electric current value control signals to the first motor and the second motor according to input signals input from the torque sensor and the speed sensor, respectively, wherein the first steering assister comprises:

a reducer including a worm wheel connected and rotated with the steering shaft, and a worm shaft tooth-meshed with the worm wheel to rotate the worm wheel which is connected with the steering shaft; and the first motor configured to rotate the worm shaft in a forward or reverse direction according to a control signal input from the electronic control unit, and wherein the second steering assister comprises:

the oil pump coupled to the second motor to deliver the hydraulic oil;

a screw nut sliding to one side or another side according to the hydraulic pressure of the hydraulic oil;

a gear box housing accommodating the screw nut and having a first cylinder and a second cylinder, which are filled with the hydraulic oil, on one side and another side with reference to the screw nut; and a sector shaft accommodated in the gear box housing and tooth-meshed with the screw nut to rotate in a forward or reverse direction when the screw nut slides, thereby operating a pitman arm.

2. The hybrid power steering system as claimed in claim 1, wherein the gear box housing has a circulation flow line that interconnects the first cylinder and the second cylinder, and a control valve for opening or closing the circulation flow line.

3. The hybrid power steering system as claimed in claim 1, further comprising a weight mode switch that selects a high weight mode and a low weight mode according to a weight of a vehicle, and sends a signal corresponding to the selected mode to the electronic control unit.

4. The hybrid power steering system as claimed in claim 3, wherein the electronic control unit sends the target electric current value control signals to the first motor and the second motor according to the input signals input from the torque sensor and the speed sensor, respectively, and when the input signal input from the weight mode switch is the high weight mode, the electronic unit increases the target electric current value control signal sent to the second motor.

5. The hybrid power steering system as claimed in claim 2, wherein the electronic control unit sends the target electric current value control signals to the first motor and the second motor according to the input signal input from the torque sensor, respectively, and when the input signal value input from the speed sensor is larger than a preset vehicle speed value, the electronic control unit stops the sending of the target electric current value control signals to the second motor.

6. The hybrid power steering system as claimed in claim 5, wherein the electronic control unit sends a control signal such that the control valve opens the circulation flow line when the electronic control unit stops the sending of the target electric current value control signal to the second motor.

7. The hybrid power steering system as claimed in claim 5 or 4, wherein the first steering assister is provided with a first electric current sensor that measures and sends an electric current value of the first motor to the electronic control unit.

8. The hybrid power steering system as claimed in claim 7, wherein when the electric current value input from the first electric current sensor and the target electric current value sent to the first motor are different from each other, the electronic control unit stops the sending of the target electric current value control signal to the first motor and increases the target electric current value sent to the second motor.

9. The hybrid power steering system as claimed in claim 5 or 4, wherein the second steering assister is provided with a second electric current sensor that measures and sends an electric current value of the second motor electric current value to the electronic control unit.

10. The hybrid power steering system as claimed in claim 9, wherein when the electric current value input from the second electric current sensor and the target electric current value sent to the second motor are different from each other, the electronic control unit stops the sending of the target electric current value control signal to the second motor and increases the target electric current value sent to the first motor.

\* \* \* \* \*